(12) United States Patent
Nimberger (10) Patent No.: US 6,367,775 B1
(45) Date of Patent: *Apr. 9, 2002

(54) UNIVERSAL FILL VALVE

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,483

(22) Filed: Apr. 20, 1999

(51) Int. Cl.[7] .................. F16K 35/00; F16K 31/524
(52) U.S. Cl. .................. 251/321; 251/263; 251/109
(58) Field of Search .................. 251/262, 263, 251/321, 107, 109

(56) References Cited

U.S. PATENT DOCUMENTS

| | | | | |
|---|---|---|---|---|
| 3,874,428 A | * | 4/1975 | Golay | 141/95 |
| 5,215,120 A | * | 6/1993 | Nimberger et al. | 137/614 |
| 5,228,474 A | * | 7/1993 | Nimberger | 137/614.04 |
| 5,320,133 A | * | 6/1994 | Nimberger | 137/614.04 |
| 5,836,352 A | | 11/1998 | Nimberger | 251/263 |

OTHER PUBLICATIONS

"Twilight Zone" LP/GAS, Feb. 1997 Issue, p. 27.

* cited by examiner

*Primary Examiner*—Kevin Shaver
*Assistant Examiner*—Eric Keasel
(74) *Attorney, Agent, or Firm*—Browning Bushman (57) ABSTRACT

Fill valve 10 controls the flow of propane from a fill line FL to a control valve CV mounted on a propane use tank T. The fill valve includes a valve body 12 having a propane inlet 20, an elongate sleeve 24 and a discharge housing 22 surrounding the elongate sleeve and having a thread 30, 19 for interconnection with a mating thread in the control valve. The sleeve 24 may be secured to the body 12 by a swaging operation. A nose tip 26 is secured to the elongate sleeve and has an external surface 68, an annular seal 70 for sealing engagement with the control valve, and a fill valve seat 100 defining a portion of a flow passage 92 therethrough. Valve stem 18 extends through the valve body and the elongate sleeve and is axially moveable between opened and closed positions. A lower end of the valve stem is positioned within the nose tip. A fill valve seal 76 is carried on the valve stem for sealing engagement and disengagement with the fill valve seat 33.

23 Claims, 3 Drawing Sheets

UNIVERSAL FILL VALVE

FIELD OF THE INVENTION

The present invention relates to a valve of a type suitable for periodic filling a fuel storage vessel. More particularly, this invention relates to a improved fill valve for external or internal threaded connection with a standard control valve mounted on a propane use tank. The fill valve of the present invention may control propane flow from a flexible hose extending from a large storage tank to the control valve and then to the smaller propane use tank. The fill valve may be closed and disconnected from the control valve without discharging significant amounts of propane to the environment.

BACKGROUND OF THE INVENTION

Propane tanks have long been used for home heating and cooking, and for limited commercial and industrial applications. The standard propane use tank includes a control valve for controlling the flow of propane from the use tank to a regulator and then to the fuel burner. To periodically refill the propane use tank, a large propane storage vessel is either transported to the propane use tank, or the propane use tank is transported to the large storage vessel. In either case, the propane use tank is conventionally filled by disconnecting the regulator and interconnecting a fill valve at the end of the flexible hose to the control valve mounted on the propane tank. The fill valve includes an elongate discharge nose for mated interconnection with threads internal of the control valve, and positions the fill valve handle outside a tank guard ring. Once the fill valve has been fluidly connected to the control valve, both the fill valve and the control valve are opened for releasing the pressurized propane from the large storage vessel to the propane use tank.

In order to reduce the time required to fill the propane use tank, the fill valve flow passageway is configured so that is does not substantially restrict the fluid flow from the flexible fill line to the propane use tank. The fill valve preferably is also of the type which may be reliably used by relatively inexperienced personnel. Preferably the fill valve is of quick-acting type with a handle which pivotably moves with respect to the valve body to move the stem from an opened position to a closed position. The fill valve is thus connected to the control valve, the operator pivots the handle to the opened position and quickly fills the propane use tank, then returns the handle to the closed position and disconnects the fill valve from the control valve.

A significant problem with the prior art propane fill valves is that the fill valve seat is spaced substantially from the end of the elongate discharge nose which is interconnected with the control valve. Accordingly, after the propane use tank is refilled and the fill valve and control valve are closed, propane in the elongate nose between the fill valve seat and the control valve seat is discharged to the environment when the fill valve is threadably disconnected from the control valve. In excess of 27 cc of pressurized propane is commonly released in a refilling operation, with the released pressurized propane expanding hundreds of times when vaporizing in the air. The cost of the discharged propane is nominal compared to the significant environmental impact caused by thousands of propane filling operations occurring daily in many locations. Also, the discharged propane may adversely affect the safety of the propane filling operator and others located in the vicinity of the filling operation.

Another significant problem with prior art propane fill valves is that the fill valve comprises a number of threadably interconnected subassemblies which, under pressure, are prone to release propane during the filling process and contribute to numerous environmental and safety hazards.

Yet another problem with prior art fill valves is the relatively high cost of manufacturing the fill valve. Components exposed to high wear are preferably manufactured from a more expensive material, such as stainless steel, while other components are preferably manufactured from lower cost grades of steel.

The disadvantages of the prior art are overcome by the present invention, and an improved fill valve suitable for filling a propane use tank with an externally or internally threaded standard control valve mounted thereon is hereinafter disclosed.

SUMMARY OF THE INVENTION

The fill valve of the present invention may be used to reliably control the filling of a propane use tank with a conventional control valve mounted thereon. The fill valve may include a quick acting pivot handle which axially moves a valve stem between the opened and the closed positions. A coil spring conventionally biases the fill valve closed. The fill valve also includes an elongate discharge nose for insertion into the control valve after the regulator has been removed. In one embodiment, an external left hand thread is provided at the discharge end or nose tip of the elongate nose for mating connection with a corresponding internal thread within the interior of the control valve. In another embodiment, an internally threaded nose tip housing is provided around the nose tip for mating connection with a corresponding externally threaded control valve. The fill valve may include a nose tip with an elastomeric external seal mounted thereon for reliable sealing engagement with a seat within the interior of the control valve. Propane flows in the annulus between the elongate nose and the valve stem, and is discharged through an aperture in the nose tip so as not to substantially restrict the flow of propane when the fill valve is in the opened position. The valve stem may extend from the pivot handle through the fill valve body and substantially through the elongate discharge nose. An elastomeric seal may be provided on the end of the valve stem for reliable sealing engagement with a seat. In one embodiment, the seat is formed separate from the nose tip.

It is an object of the invention to provide an improved fill valve of the type which may be used for filling a fluid tank. The fill valve of the present invention may include an elongate discharge nose with an external seal provided on the nose tip for sealing with a seat in a convention control valve. Alternatively, a surface on the nose tip may engage a seal provided in the control valve. The fill valve seal and seat are positioned closely adjacent the discharge end of the fill valve. The fill valve may thus be connected to the control valve mounted on the fluid use tank, and very little fluid is discharged to the environment when the fill valve is removed from the control valve.

It is another object of the invention to provide an improved fill valve with a elongate discharge nose, nose tip and nose tip housing surrounding the nose tip such that the fill valve may be threadably connected to a control valve mounted on the propane use tank. In one embodiment, the fill valve is designed for engagement with internal pocket threads in the control valve. In another embodiment, the fill valve is designed to be secured to external threads on the control valve.

Yet another object of the present invention is providing an improved technique for manufacturing and assembling a fill valve to provide a highly reliable valve with a lower manufacturing cost. According to one embodiment, an elongate sleeve is permanently interconnected with a seat member to form a sleeve-seat subassembly, and a discharge housing is thereafter positioned over the sleeve-seat subassembly. A nose tip is thereafter permanently secured to a lower end of the sleeve-seat subassembly, and a valve stem is positioned through the valve body and the sleeve-seat subassembly. According to another embodiment of the invention, the elongate sleeve is permanently interconnected with a nose tip to form a sleeve-nose tip subassembly, an upper housing is positioned about the sleeve-nose tip subassembly, the nose tip housing is thereafter secured to the upper housing, then a valve stem is positioned between the valve body and the sleeve-nose tip subassembly.

It is a feature of the invention to provide an improved fill valve with at least a body, a housing, a sleeve, and a nose tip that may be integrally connected by two or more flared portions for preventing the escape of propane and enhancing safety during use of the fill valve.

Yet another feature of the invention is a fill valve which may be manufactured at a relatively low cost and which is highly reliable.

It is an advantage of the invention that the lower stem may include an alignment mechanism for substantially aligning the lower stem within the flow passageway in the elongate discharge nose of the fill valve. The lower stem may be provided with one or more alignment pins which slidably engage the interior surface of the passageway in the elongate nose when the handle moves between the opened and closed positions.

It is further advantage of this invention that the fill valve may be used is conjunction with existing control valves of the type conventionally mounted on propane tanks. It is estimated that several million such control valves are in operation. Accordingly, the fill valve of the present invention significantly reduces the discharge of propane to the environment but does not require modifications to the conventional control valve. In another embodiment, the fill valve is designed for use with a newer type of control valve having external threads and a check valve.

In the further advantage of the present invention that the fill valve may be manufactured at a cost which is not significantly greater than prior art fill valves, although the fill valve of the present invention has a significant advantage of reducing the discharge of propane to the environment.

These and other objects, features and advantages of the present invention will become apparent from the following detailed description, wherein reference is made to the figures in the accompanying drawings.

DETAILED DESCRIPTION OF PREFERRED EMBODIMENTS

The fill valve of the present invention is suitable for use in periodically filling a fuel storage tank, and particularly a propane use tank. Propane use tanks are widely used in many countries for home heating and cooking, and are also used in some commercial and industrial applications. During normal use of the propane tank, a regulator is threadably connected to a control valve (also referred to as a filler valve) mounted on the propane use tank to regulate output propane pressure, so that the user opens the control valve to control the flow of propane to a burner. The propane use tank must be periodically refilled from a large propane storage vessel. Depending on the practice in a particular locale and the desires of the propane user, the user may either transport the propane use tank to a large propane storage vessel to refill the propane use tank, or a service company may periodically bring a large propane storage tank by the home or business of the user to periodically fill the propane use tank.

Figure 1:
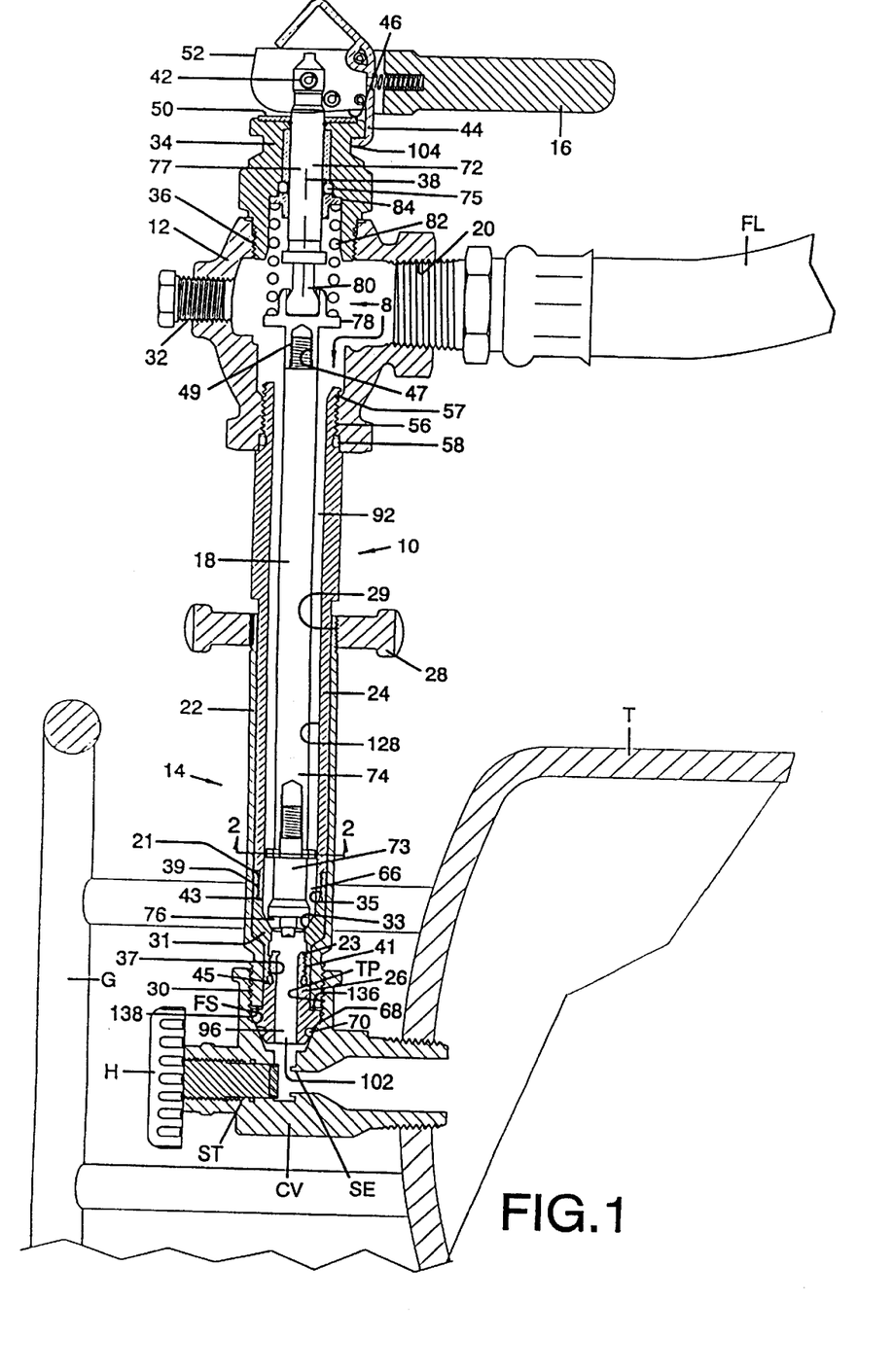
FIG. 1 is a simplified cross-sectional view of one embodiment of the fill valve having an externally threaded elongate discharge nose interconnected with an internally threaded conventional control valve on a propane tank.

The fill valve 10 of the present invention is intended for internal (FIG. 1) or external (FIG. 3) threaded connection with a standard control valve CV as shown in FIG. 1 which mounts to a propane use tank T. The handle H of the control valve CV may be rotated to engage and disengage the control valve stem ST with the control valve seat SE, thereby closing and opening the control valve. A flexible fill line FL feeds propane in the direction indicated by arrow 8 and interconnects a larger propane storage tank (not shown) with the fill valve 10. To fill the propane use tank, a regulator (not shown) is disconnected from the closed control valve and the fill valve 10 is connected to the control valve. More particularly the regulator is thus normally connected to the threaded port TP of the control valve, with the control valve including a frustoconical seat FS for sealing with the regulator. The control valve CV may be closed, the regulator removed, and the fill valve 10 connected to the threaded port TP and sealed with the frustoconical seat FS during a propane filing operation. The fill valve and control valve are then opened to discharge the pressurized propane from the storage tank to the propane use tank. After the filling operation, the control valve and fill valve are closed, the fill valve is removed, and the regulator is again connected to the control valve.

The propane use tank T conventionally includes a ring guard G which protects the control valve. The elongate discharge nose 14 of the fill valve 10 thus spaces the operating handle for the fill valve laterally from the control valve CV, and preferably laterally exterior of the guard G, to easily and safely interconnect the equipment as shown in FIG. 1 and to accomplish the filling operation. The fill valve 10 therefore generally includes a valve body 12, an elongate discharge nose 14, a pivot handle 16, and a valve stem 18 each discussed in further detail below. The flexible fill line connects to threaded inlet port 20 in the valve body 12. Those skilled in the art will appreciate that the fill line extends from a large propane storage tank to the fill valve 10.

The fill valve 10 is shown in its vertical position in the figures for ease of reference. It should be understood that the terms "top" or "upper" and "bottom" or "lower" when referring to the fill valve FL are intended to reference the handle end and discharge end, respectively, of the fill valve, and do not limit the design or orientation of the fill valve once installed on a control valve.

To facilitate interconnection of the fill valve 10 in FIG. 1 with a control valve, the fill valve 10 is provided with an elongate discharge nose 14 which includes an outer nose housing 22, a nose sleeve 24, and a nose tip 26. The nose housing 22 includes a handwheel 28 threaded at 29 to the housing 22. The handwheel 28 includes an outer torque surface which may have circumferentially spaced gripping recesses for connecting the housing 22 to the control valve without requiring a wrench. The filling operator may thus initially interconnect the threads 30 at the lower end of the housing 22 to the threaded port of a control valve, and make up a reliable connection between the fill valve 10 and the control valve by applying a selected torque to the housing 22 using only the handwheel 28. During the make-up operation, the housing 22 rotates about the stationary sleeve 24 connected with the valve body 12, so that the valve body 12 and the flexible line connected therewith need not rotate. Axial force will be transmitted from the housing 22 to the nose tip 26 to force the nose tip into reliable sealing engagement with a seat in the control valve. The fill valve 10 as shown in FIG. 1 is in the closed position, while the similar fill valve 10 as shown in FIG. 3 is in the opened position.

The nose tip 26 is connected via seat member 31 to the lower end of the sleeve 24, and is also generally sleeve-shaped. The seat member 31 includes a seating surface 33, an upper internally threaded end 35 and a lower internally threaded end 37. Thus, the upper internally threaded end 35 is threadably connected to a lower externally threaded end 39 of the sleeve 24. The lower internally threaded end 37 is threadably connected to an upper externally threaded end 41 of the nose tip 26. A conventional static O-ring 43 is positioned between the upper internally threaded end 35 and the lower externally threaded end 39. Similarly, an O-ring 45 seals between the lower internally threaded end 37 and the upper externally threaded end 41. A frustoconical exterior surface 68 and an elastomeric O-ring 70 are provided at the lower end of the nose tip 26 for sealing engagement with a mating frustoconical surface in the control valve.

Figure 3:
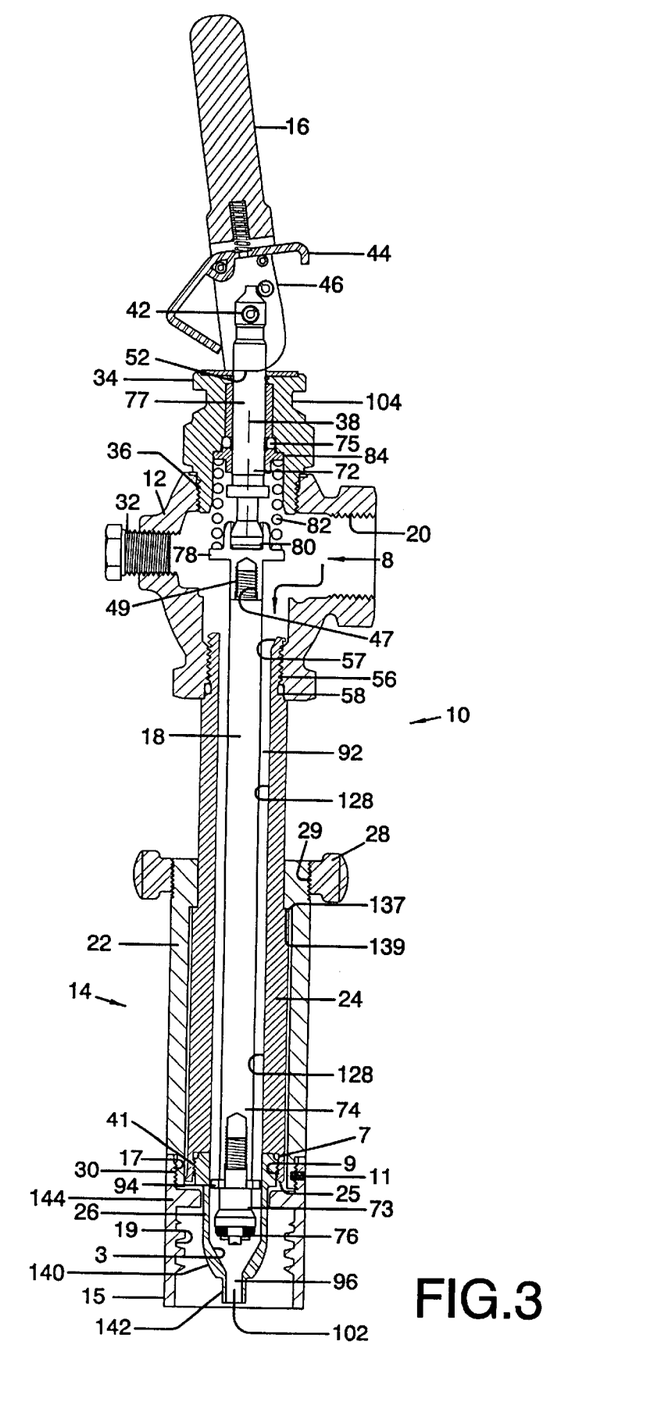
FIG. 3 is a simplified cross-sectional view of another embodiment of the fill valve having a elongate discharge nose and internally threaded nose tip housing for interconnection with an externally threaded conventional control valve on a propane tank.

In the embodiment depicted in FIG. 3, a nose tip housing 15 may be threadably connected to the upper housing 22 for interconnection with a control valve that is externally threaded. Thus, the nose tip housing 15 includes a first internally threaded end 17 for threaded connection with the threads 30 at the lower end of the housing 22 and a second internally threaded end 19 for threaded connection with an externally threaded control valve. Ideally, a lockpin 11 is used to fixedly interconnect the housing 22 and nose tip housing 15, although a swaging or dimpling operation alternatively could be used for this purpose. The upper externally threaded end 41 of the nose tip 26 is threadably connected to a lower internally threaded end 9 of sleeve 24 thus, replacing the seat member 31 in FIG. 1. A conventional static O-ring 7 seals the connection between the upper threaded end 41 of the nose tip 26 and the lower threaded end 9 of the sleeve 24.

Referring now to both FIGS. 1 and 3, the inlet port 20 in the valve body 12 is normally sized for mating connection with a ¾" NPT thread on a flexible hose. The opposing side of the valve body preferably includes a port to optionally interconnect a hydrostatic relief valve to the valve body, with this port being filled for the depicted embodiment by a conventional plug 32. A bonnet 34 is threadably connected at 36 to the valve body 12, and valve stem 18 having a stem axis 38 passes through the bonnet 34, the valve body 12, and the sleeve 24. Sleeve 24 is threadably connected to the valve body 12 by threads 56, and is sealed therewith by conventional static O-ring 58.

A quick acting pivot handle 16 is pivotably connected to stem 18 by pin 42, and may also include a latch 44 for engagement with the valve body 12 to lock the valve closed. The handle 16 includes a side surface 46 for engagement with pad 50 on the upper end of the bonnet 34 when the fill valve 10 is in the closed position, and an end surface 52 for engagement with the pad 50 when the valve 10 is in the opened position. The handle 16 thus typically rotates through an obtuse angle of about 100° between the opened and the closed positions, and this obtuse angle assists in holding the handle 16 and thus the valve in the opened position. The handle 16 is one type of operator for moving the valve item between the opened and the closed position. Other types of operators, including powered valve operators, may be used for opening and closing the fill valve. Valve operators are well known in the art and are commercially available from various sources.

The valve stem 18 includes upper stem 72 and lower stem 74. The lower stem 74 threadably receives a valve plug 73 with a TELFLON or polytetrafluoroethylene seal 76 on a lower end of the plug 73. A seal 75 seals between the upper stem 72 and the bonnet 34. The upper stem 72 includes a stem portion 77 and a stem member 78 interconnected by a ball and socket connection 80 which allows rotation of the member 78 with respect to the stem portion 77 to minimize wear on the seal 76 during operation of the fill valve. Coil spring 82 is sandwiched between the upper spring retainer 84 and the stem member 78 and biases the stem member 78 downward towards the discharge nose 14 of the fill valve. Stem member 78 includes internal threads 47 for threadably connecting the upper externally threaded end 49 of the generally cylindrical lower stem 74.

Figure 2:
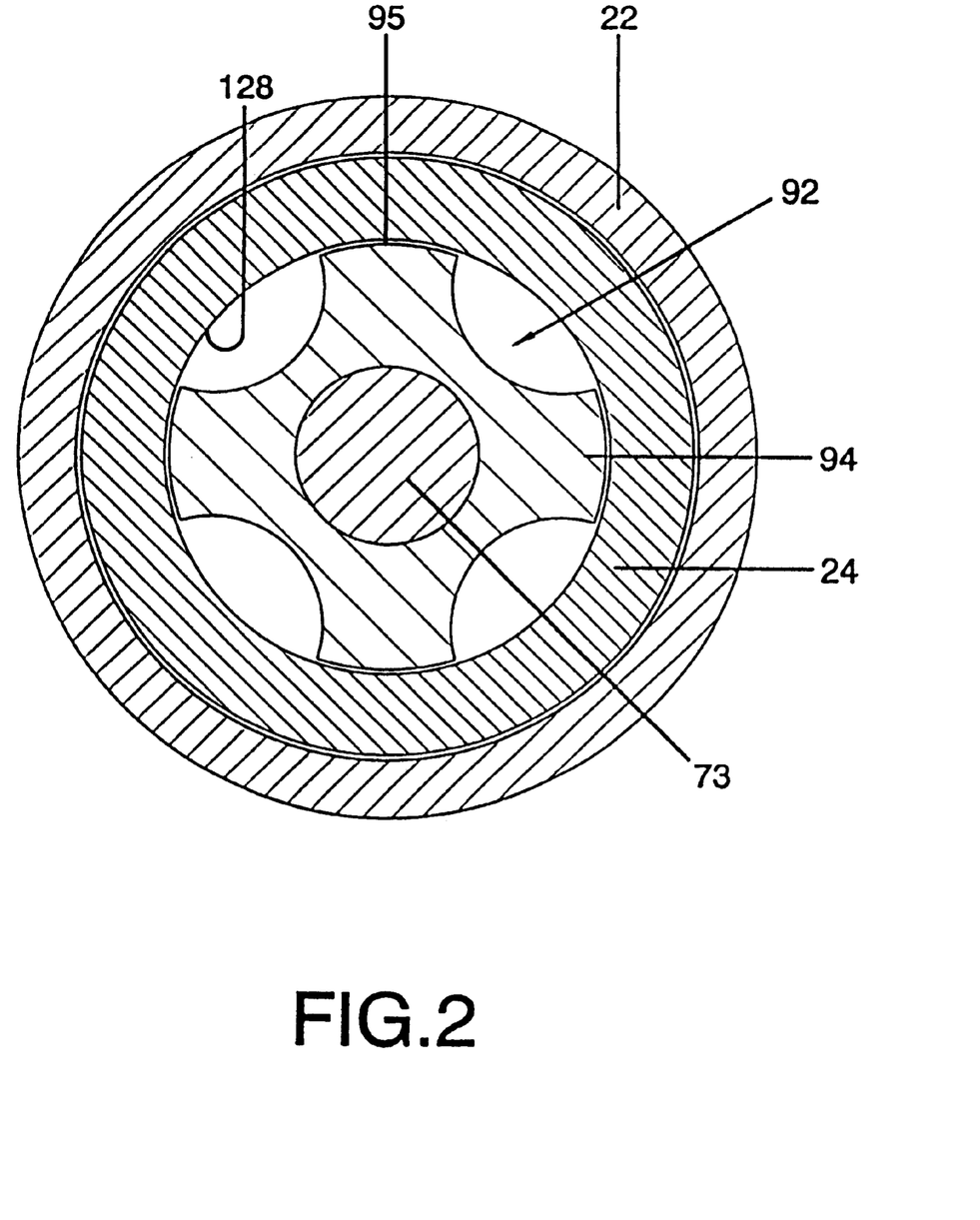
FIG. 2 is a cross-sectional view taken along line 2—2 in FIG. 1.

The sleeve 24 and lower stem 74 define an elongate annular passageway 92 therebetween for transmitting propane from the fill line to the control valve and then to the use tank. A plurality of circumferentially spaced alignment members 94 including radially projecting stubs as shown in FIG. 2 are positioned between the lower stem 74 and the plug 73 and include end surfaces 95 for sliding engagement with the interior surface 128 of the sleeve 24 for maintaining the axis of the lower stem 74 in proper alignment with the axis of the sleeve 24. A central passageway 96 is formed in the interior cylindrical surface of the nose tip 26. The passageway 96 is more restrictive than annulus 92, and effectively governs the maximum flow of propane through the fill valve 10 for a given differential pressure. The left hand thread 30 at the end of the housing 22 in FIG. 1 is sized for mating engagement with a threaded port in a conventional control valve such that the cross-sectional flow area of the discharge port 102 from the nose tip 26 is sufficiently large to meet or exceed the cross-sectional area of prior art fill valves and comply with industry standards for passing propane to fill the propane tank in a satisfactory time period. Similarly, the cross-sectional flow area of the discharge port or opening 102 in the nose tip 26 of FIG. 3 is sufficiently large to meet or exceed the cross-sectional area of prior art fill valves and comply with industry standards for passing propane to fill the propane tank in a reasonable time frame.

Referring still to FIG. 1, the nose tip 26 is designed for sealing engagement with a frustoconical seat within the control valve. Thus, the nose tip 26 is designed so that the plug 73 and the TEFLON or polytetrafluoroethylene seal 76 do not substantially restrict the flow of propane to the tank when the fill valve is open. More particularly, the cross-sectional flow area past the plug 73 when the fill valve is fully open is equal to or exceeds the cross-sectional flow area of the discharge opening 102 which, as explained above, is equal to or exceeds the industry standard for prior art fill valves. The plug 73 for the fill valve 10 depicted in FIG. 3 is similarly designed.

In FIG. 3, the nose tip 26 is provided with a seat 3 for sealing engagement with the seal 76 on the plug 73 when the fill valve 10 is in the closed position. Therefore, the function of sealing between the seal 76 and seat 3 is similar to that described in reference to the fill valve depicted in FIG. 1, with the exception that the seat 3 is formed in the nose tip 26 rather than on the seat member 31 shown in FIG. 1. The nose tip 26 as shown in FIG. 3 includes an external seating surface 140 for sealing engagement with a sealing surface (not shown) on the control valve CV. The control valve CV in this case may have external threads for mating with threads 19, and may also contain a conventional O-ring or other elastomeric seal for fluid tight sealing engagement with seating surface 140. An end projection 142 on the nose tip 26 is provided for opening a check valve positioned within the control valve CV, thereby automatically opening the check valve when the nose tip 26 is sealed with the control valve seat.

Referring now to FIGS. 1 and 3, retaining latch 44 may be provided on the handle 16 for fitting within the groove 104 in the bonnet 34, thereby ensuring that the fill valve 10 cannot be inadvertently bumped and the handle 16 moved to the opened position. Instead, the filling operator must first release the interconnection between the latch 44 and the bonnet 34, and then rotate the handle from the closed position to the opened position. When the handle 16 is lowered to the closed position, the substantial biasing force of the spring 82 biases the plug 73 and seal 76 downward against the seat surface 33 in FIG. 1 and seat surface 3 in FIG. 3.

When the fill valve 10 in FIG. 1 is installed on the control valve, the shoulder surface 136 mates with the end surface 138 on the housing 22 so that these mating surfaces cooperate to reliably transmit the force required to seal between the nose tip 26 and the control valve. When the fill valve 10 shown in FIG. 3 is installed on the control valve, the shoulder surface 137 mates with stop surface 139 on the housing 22 so that these mating surfaces cooperate to reliably transmit the force required to seal between the nose tip 26 and the control valve. A radially inward directed ring 144 on the nose tip housing 15 prevents the upper housing 22 from moving upward toward the valve body 12, thereby protecting the nose tip 26 of the fill valve prior to assembly on the control valve CV.

According to a preferred embodiment, the plug 73 of the lower stem portion 74 has a generally barrel-shaped configuration, and the seal 76 is positioned on the lower portion of the plug 73 about a generally frustoconical surface of the plug 73 having an apex below the stem 18. In less desired embodiments, a metal sealing surface on the plug 73 could sealingly engage the seating surface on either the seating member as shown in FIG. 1 or the nose tip as shown in FIG. 3.

A nominal diameter of the discharge opening 102 from the fill valve 10 is at least 0.240 inches, and preferably the opening 102 has a nominal diameter of at least 0.245 inches so as not to substantially restrict the flow of propane from the fill valve. The desired relatively large diameter of the opening 102 inherently causes the valve stem seal to have an effective seal diameter for sealing engagement with the seating surface which is larger than the diameter of opening 102. Preferably, the valve stem seal thus has an effective nominal sealing diameter which is at least 0.280 inches, and preferably is at least 0.295 inches. Alternatively, an enlarged diameter stem seal could be mounted on the lowermost end of the valve stem 18 which has a lower stem portion 74 of a uniform diameter. In any event, however, the stem seal must have a diameter greater than the opening 102, and preferably the stem seal has a diameter at least as large as the nominal diameter of the lower stem portion 74 which is intentionally small in order to maintain a large cross-sectional flow passageway 96.

The term "nominal diameter" as used herein with respect to opening 102 and stem seal 76 is intended in its normal sense to mean the effective diameter if the component has a generally circular configuration. For example, the opening 102 could have a non-circular configuration, in which case the opening 102 would still have a nominal diameter which corresponds to the diameter of the opening if circular, so as to achieve the purposes and benefits described herein, and particularly the benefits of maximizing flow of propane through the relatively small nose tip.

The fill valves depicted in FIGS. 1 and 3 are therefore functionally similar and contain similar components with the differences described above. Likewise, the manufacture and production methods used to manufacture the fill valve 10 depicted in FIGS. 1 and 3 are similarly related with minor distinctions described below. Notwithstanding the manufacturing differences between the fill valve 10 depicted in FIGS. 1 and 3, both fill valves are economically manufactured to conserve manufacturing costs and reduce environmental and safety hazards associated with conventional fill valves.

The fill valve is capable of attachment to a control valve that is either internally or externally threaded, as shown in FIGS. 1 and 3. In either case, the fill valve is light-weight, easy to use, and designed to minimize the amount of fluid released during a disconnect operation. The embodiment as shown in FIG. 1 releases only about 1.4 cc of fluid upon a disconnect, and the embodiment as shown in FIG. 3 releases only about 0.4 cc upon disconnect. The nose tip 26 which mates with the control valve CV may be manufactured from stainless steel to ensure reliable operation over a relatively long life without signficantly increasing the cost of the fill valve.

It is also important according to this invention to appreciate the manner in which such components and sub-components of the fill valve are machined and assembled. The nose tip 26 and seat member 31, if used, are typically machined from a corrosion resistant hardened material such as 17-4 stainless steel, and are preferably fabricated as separate components from the sleeve 24. If desired, the nose tip housing 15 may also be fabricated from stainless steel. The sleeve 24, the upper housing 22 and most other metal components of the fill valve may be machined from a less expensive and softer material, such as conventional carbon steel. Thus, the hardened material is used to machine most of the fill valve components that are subject to frequent use, friction and wear near the elongate nose portion 14 of the fill valve 10, while less expensive material is used to manufacture less critical components.

The subassembly of the housing 22, sleeve 24, seating member 31 and nose tip 26 as shown in FIG. 1 may be formed by first threadably connecting the upper threaded end 35 of the seating member 31 to the lower threaded end 39 of the sleeve 24. Once the seating member 31 and sleeve 24 are threadably connected, a radial inward flared portion 21 is formed by radially deforming the distal upper threaded end 39 of the seating member 31 with respect to the housing 24. Once the seating member 31 is permanently secured to the sleeve 24 by radially deforming the inward flared portion 21, the sleeve 24 and seating member 31 (forming a sleeve-seat subassembly) may then be inserted through the open upper end of-the housing 22. The upper threaded end 41 of the nose tip 26 may then be threadably connected to the lower threaded end 37 of the seating member 31. After the nose tip 26 is threadably connected to the sleeve-seat subassembly, the connection may then be made permanent by radially deforming a distal end of the upper threaded end 41 of the nose tip 26 with respect to the seating member 31 to form a outward flared portion 23. The outward flared portion 23 may be formed by any conventional flaring tool which may be inserted through the lower opening 102 of the nose tip 26. Alternatively, a flaring tool to form the flared portion 23 may be inserted through the upper end of the sleeve 24. Once the sleeve 24, housing 22, seating member 31 and nose tip 26 are integrally connected by flared portions 21 and 23, this subassembly may then be threadably connected at 56 to the valve body 12 and permanently secured thereto by radially deforming a distal end of the threads 56 with respect to the body 12 to form a outward flared portion 57. By providing flared portions 21, 23 and 57, the manufacturer of the fill valve essentially ensures that the user cannot inadvertently remove the subassemblies comprising the sleeve 24, housing 22, seating member 31 and nose tip 26 from the body 12. For purposes of comparison to conventional valves, only the right of each flared portion 21, 23 and 57 is depicted in the fill valve shown in FIGS. 1 and 3, and the left side is shown in its connected but pre-flared state.

The fill valve 10 depicted in FIG. 3 is formed and assembled in similar but modified fashion. The upper threaded end 41 of the nose tip 26 is threadably connected to the lower threaded end 9 of the sleeve 24 and may be permanently secured by radially deforming a distal end of the lower threaded end 9 of the sleeve 24 to form a inward radial portion 25. The sleeve 24 and nose tip 26 subassembly may then be inserted through the open lower threaded end 30 of the upper housing 22. The nose tip housing 15 may then be threadably secured to the upper housing 22, with this connection being fixedly secured by pin 11. The upper end of the sleeve 24 is then threadably connected at 56 to the body 12 and a distal end of the threads 56 is radially deformed to form an outward flared portion 57 as similarly described in reference to the outward flared portion 57 in FIG. 1. Thus, once the sleeve 24 and nose tip 26 subassembly is permanently joined with respect to each other and the body 12, the subassemblies comprising the fill valve 10 may not become disconnected during use. If desired, the nose tip housing 15 may be threadably connected to the housing 22 and lock pin 11 installed after the connection formed by flared portion 57 is made.

Although other permanent forming operations such as conventional pinning or dimpling may be recognized by those having skill in the art, permanent interconnection of the lower components comprising the elongate nose 14 in FIGS. 1 and 3 is preferably accomplished by the flaring or crimping process as described herein. The lower components comprising the elongate nose 14 in FIGS. 1 and 3 preferably have a relatively thin wall thickness and must not be substantially deformed in such a way that will compromise the corresponding seal between each component, or obstruct the fluid flow path through the fill valve. Therefore, flared portions 21 and 23 in FIG. 1 and flared portion 25 in FIG. 2 overcome problems associated with less practical methods of forming a permanent connection. Dimpling procedures, which are a type of circumferentially localized swaging rather than a conventional uniform swaging operation, may be used to permanently connect components. Dimpling procedures to form a permanent connection of these components is less desirable since it may lead to obstructions in the fluid flow path. Pinning procedures to form the interconnection of these components which may cause an unwanted leak path, thus adversely affecting sealing integrity.

To initially assemble the valve stem 18 within the valve body 12, a subassembly comprising bonnet 34, handle 16 and valve stem 78 (including stem portion 77, member 78 and lower stem 74), and spring 82 may be passed partially through an upper port surrounding valve body threads 36, and the bonnet 34 then threaded to the valve body 12. This same subassembly may be removed from the body 12, sleeve 24 and housing 22 to inspect the TEFLON or polytetrafluoroethylene seal 76.

The fill valve as shown in FIG. 1 is thus intended for mating with a conventional control valve which has internal threads within a control valve pocket, as shown in FIG. 1. The modified control valve as shown in FIG. 3 is designed for use with a more recently introduced type of control valve which has external threads and a check valve positioned within the body of the control valve. An elastomeric seal for reliable sealing engagement between a seating surface 140 on the nose tip 26 of the fill valve may be provided within the control valve CV. In modified forms of the invention, the elastomeric seal 70 on the nose tip as shown in FIG. 1 may be eliminated, and if desired an elastomeric seal may be provided in the control valve CV. Similarly, the embodiment as shown in FIG. 3 may be adapted for reliable sealing engagement with a control valve by providing an elastomeric seal on the external surface of the nose tip 26.

The foregoing disclosure and description of the invention is illustrative and explanatory. It will be appreciated by those skilled in the art that various changes in the size, shape and materials, as well as in the details of the illustrated construction or combinations of features and the methods discussed herein may be made without departing from the spirit of the invention.

What is claimed is:

1. A fill valve for controlling the flow of fluid from a fill line in fluid communication with a storage vessel to a control valve in fluid communication with a use tank, the control valve having an internal control valve thread and a control valve seat, the fill valve comprising:

a valve body having a fluid inlet for fluid interconnection with the fill line;

an elongate sleeve interconnected with the valve body;

a discharge housing surrounding the elongate sleeve, the discharge housing including a discharge end having an external thread for threaded interconnection with the internal control valve thread;

a seat member formed structurally separate from the elongate sleeve and fixedly interconnected thereto, the seat member defining a fill valve seat about a flow passageway through the seat member;

a nose tip formed structurally separate from the seat member and fixedly interconnected thereto, the nose tip having an exterior surface for sealing engagement with the control valve seat;

a valve stem extending through the valve body and the elongate sleeve, the valve stem being axially moveable with respect to the valve body between an opened position and a closed position, the valve stem having a lower stem portion for selective engagement and disengagement with the fill valve seat to close and open the fill valve respectively; and an operator for moving the valve stem between the opened position and the closed position.

2. The fill valve as defined in claim 1, further comprising:

a spring for biasing the valve stem to the closed position; and an annular nose tip seal carried on the nose tip.

3. The fill valve as defined in claim 1, further comprising:
a valve stem guide for engagement with a cylindrical internal surface of the elongate sleeve for guiding the lower valve stem portion with respect to the elongate sleeve when the valve stem is moved between the opened position and the closed position.

4. The fill valve as defined in claim 1, further comprising:
the discharge housing being rotatable with respect to the elongate sleeve; and
the discharge housing having a torque surface thereon for rotating the discharge housing to threadably connect the discharge housing to the control valve while the elongate sleeve remains substantially non-rotating.

5. The fill valve as defined in claim 1, wherein a planar stop surface on the nose tip engages an end surface on the discharge housing.

6. The fill valve as defined in claim 1, further comprising:
a fill valve seal carried on the lower stem portion of the valve stem for sealing engagement with the fill valve seat.

7. A method of manufacturing a fill valve for controlling the flow of fluid from a fill line to a control valve having an internal control valve thread and a control valve seat, the method comprising:
forming a valve body having a fluid inlet for fluid interconnection with the fill line;
permanently interconnecting an elongate sleeve with a seat member to form a sleeve-seat subassembly;
forming a discharge housing with a discharge end having an external thread for threaded interconnection with the internal control valve thread;
positioning the discharge housing about the sleeve-seat subassembly;
thereafter permanently securing a nose tip to a lower end of the sleeve-seat subassembly, the nose tip having an exterior surface for sealing engagement with the control valve seat;
extending a valve stem through the valve body and the sleeve-seat subassembly, the valve stem being axially moveable with respect to the valve body for selective engagement and disengagement with the seat member to open and close the fill valve;
biasing the valve stem to the closed position; and
connecting an actuator to the valve stem for axially moving the valve stem between the opened position and the closed position.

8. The method as defined in claim 7, further comprising:
pivotably interconnecting an upper seam portion of the valve stem with the actuator.

9. The method as defined in claim 7, further comprising:
permanently interconnecting the sleeve-seat subassembly with the valve body.

10. The method as defined in claim 9, wherein the elongate sleeve is permanently interconnected with the seat member by a swaging operation.

11. The method as defined in claim 7, wherein the nose tip is interconnected with the seat member by a radial outward swaging operation.

12. The method as defined in claim 7, further comprising:
positioning a fill valve seal on the valve stem for sealing engagement with the seat member.

13. A fill valve for controlling the flow of fluid from a fill line in fluid communication with a storage vessel to a control valve in fluid communication with a use tank, the control valve having an external control valve thread and a control valve seat, the fill valve comprising:
a valve body having a fluid inlet for fluid interconnection with the fill line;
an elongate sleeve interconnected with the valve body;
a discharge housing surrounding the elongate sleeve, the discharge housing including a discharge end having an internal thread for threaded interconnection with the external control valve thread;
a nose tip formed structurally separate from the elongate sleeve and fixedly interconnected thereto, the nose tip having a fill valve seat about a flow passageway through the nose tip and an exterior surface for sealing engagement with the control valve seat;
a valve stem extending through the valve body and the elongate sleeve, the valve stem being axially moveable with respect to the valve body between an opened position and a closed position, the valve stem having a lower stem portion positioned within the nose tip for selective engagement and disengagement with the fill valve seat to close and open the fill valve, respectively;
a spring for biasing the valve stem to the closed position; and
an operator for moving the valve stem between the opened position and the closed position.

14. The fill valve as defined in claim 13, further comprising:
an end projection on the nose tip for opening the control valve when the nose tip is sealed with the control valve seat.

15. The fill valve as defined in claim 13, further comprising:
a valve stem guide for engagement with a cylindrical internal surface of the elongate sleeve for guiding the lower valve stem portion with respect to the elongate sleeve when the valve stem is moved between the opened position and the closed position.

16. The fill valve as defined in claim 13, further comprising:
the discharge housing being rotatable with respect to the elongate sleeve; and
the discharge housing having a torque surface thereon for rotating the discharge housing to threadably connect the discharge housing to the control valve while the elongate sleeve remains substantially non-rotating.

17. The fill valve as defined in claim 16, wherein a shoulder surface on the discharge housing engages a stop surface on the nose tip for retaining the nose tip within the discharge housing.

18. The fill valve as defined in claim 16, wherein the discharge housing comprises:
an upper housing supporting the torque surface thereon and having an upper housing stop for engagement with an elongate sleeve stop surface; and
a lower nose tip housing removably connected with the upper housing and including the internal thread.

19. A method of manufacturing a fill valve for controlling the flow of fluid from a fill line to a control valve having control valve external thread and a control valve seat, the method comprising:
forming a valve body having a fluid inlet for fluid interconnection with the fill line;
permanently interconnecting an elongate sleeve with a nose tip to form a sleeve-nose tip subassembly, the nose tip having an exterior surface for sealing engagement with the control valve seat;
forming an upper housing;

forming a nose tip housing having an internal thread for threaded interconnection with the control valve external thread;

positioning the upper housing about the sleeve-nose tip subassembly;

thereafter securing the nose tip housing to the upper housing;

extending a valve stem through the valve body and the sleeve-nose tip subassembly, the valve stem being axially moveable with respect to the valve body between an opened position and a closed position for selective engagement and disengagement with the fill valve seat to close and open the fill valve;

biasing the valve stem to the closed position; and connecting an actuator to the valve stem for axially moving the valve stem between the opened position and the closed position.

20. The method as defined in claim 19, further comprising:

pivotably interconnecting an upper stem portion of the valve stem with the actuator.

21. The method as defined in claim 19, further comprising:

permanently interconnecting the sleeve-nose tip subassembly with the valve body.

22. The method as defined in claim 19, wherein the nose tip is interconnected with the elongate sleeve by a radial outward swaging operation.

23. The method as defined in claim 19, further comprising:

positioning a valve stem seal on a lower end of the valve stem for sealing engagement with the fill valve seat.

* * * * *